INVENTOR.
JOHN F. BECKERICH
BY *[signature]*
ATTORNEY
*[signature]*
AGENT

INVENTOR.
JOHN F. BECKERICH
BY Marvin Moody
ATTORNEY
R W Anderson
AGENT

United States Patent Office 2,998,517

Patented Aug. 29, 1961

2,998,517

VARIABLE BANDWIDTH AND CENTER FREQUENCY RECEIVING SCHEME

John F. Beckerich, Dallas, Tex., assignor to Collins Radio Company, Cedar Rapids, Iowa, a corporation of Iowa Filed Mar. 11, 1960, Ser. No. 14,316
6 Claims. (Cl. 250—20)

This invention relates generally to bandwidth control in a frequency selective device and more particularly to a method of and means for providing a variable bandwidth and center frequency device in which a plurality of bandwidth center frequencies may be readily preselected and a plurality of bandwidths symmetrically disposed about each center frequency may be attained.

In radio and radar fields it often becomes desirable to control the bandwidth of the I–F portions thereof for example whereby interfering signals may be judiciously eliminated or precise spectrum analysis may be performed upon a given input energy frequency spectrum.

Bandwidth control devices are known in the art whereby the lower and/or upper frequencies of a received bandwidth spectrum may be varied, as for example, that described in Patent No. 2,747,084 to M. L. Doelz entitled "Variable Bandwidth Intermediate Frequency System" and assigned to the assignor of the present invention. The Doelz patent teaches a system of conversion and selective filtering to permit independent adjustment of either or both edges of a frequency response curve to obtain bandpass control. The present invention is a decided improvement over that disclosed by Doelz in that any one of a plurality of center frequencies may be selected and any one of a plurality of bandwidths symmetrically disposed about the selected center frequencies may be attained by the setting of first and second controls respectively. The present invention further incorporates means whereby regardless of the center frequency or bandwidth chosen the output spectrum is symmetrically disposed about a fixed predetermined center frequency. This provides the decided advantage of allowing the signal to remain centered in succeeding fix-tuned amplifier stages.

The present invention, through a unique system of conversion and mixing, incorporates a first oscillator, the selected frequency of which is directly related to center frequency and a second oscillator, the selected frequencies of which are directly related to various bandwidths centered about a selected center frequency. The oscillators may be controlled by multiposition switch means, each position of which corresponds to a given oscillator frequency, thus enabling calibration of the switch positions for direct reading of center frequency and bandwith respectively. The oscillators may also be continuously variable in frequency with correspondingly referenced controls to enable selection of continuously variable bandwidths and center frequencies.

The present invention thereby finds versatile usage as a limited range spectrum analyzer; permits individual examination of sidebands of a modulated input signal; produces ready means for measuring the doppler shift of continuous wave signals; and may be utilized to measure the spectrum energy of modulated doppler shifted signals.

The invention is featured in the provision of first and second oscillators whose frequencies are determinate respectively of center frequency and bandwidth, together with a unique mixing and selective filtering arrangement including a frequency doubling arrangement whereby the selected bandwidth is always centered about a fixed frequency regardless of the input spectrum center frequency or bandwidth selected. The latter is attained by novel differential action provided by multiple mixing of the first and second harmonics of the bandwidth determining oscillator frequency.

The object of the present invention is to provide means for selectively passing various preselected portions of an input signal spectrum and to center these selected portions about a fixed center frequency at the output, so that succeeding stages of amplification may be designed for a fixed bandwidth and center frequency regardless of what portion of the input spectrum is selected.

Further objects and features of the present invention will become apparent upon reading the following description in conjunction with the accompanying drawings in which:

FIGURE 1 represents a block diagram of the present invention, and includes operational frequency parameters for a specific embodiment according to the principles of the present invention.

Figure 1:
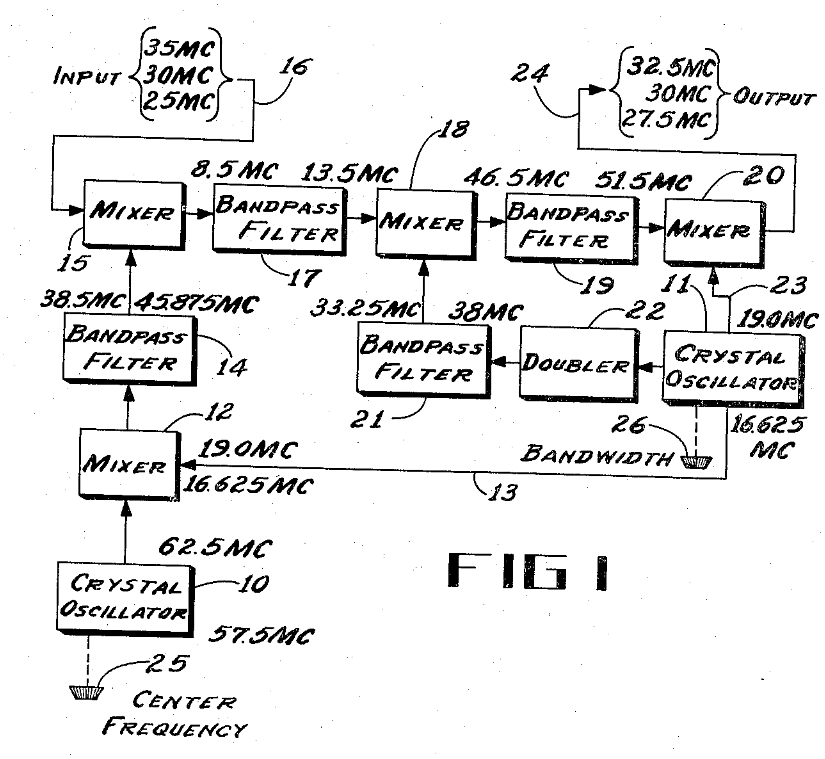
FIGURE 1 is a functional block diagram of an embodiment of the present invention.

With reference to FIGURE 1, the system is seen to comprise a first crystal oscillator 10, the operating frequency of which may be selected by the positioning of a "Center Frequency" control 25, and a second oscillator, the frequency of which may be selected by positioning of a "Bandwidth" control 26. The output $f_1$ from oscillator 10 is applied to a first mixer 12. The fundamental output $f_2$ of oscillator 11 is applied through connector 13 as a second input to mixer 12. Output from mixer 12 is applied through bandpass filter 14 to a second mixer 15, filter 14 being selected to pass the difference spectrum between the inputs to mixer 12, or $(f_1-f_2)$.

The $(f_1-f_2)$ output from filter 14 is mixed with the input signal frequency spectrum applied to mixer 15 on connector 16 and the output from mixer 15 is applied to bandpass filter 17. Filter 17 is designed to pass the difference between the input frequencies to mixer 15 which may be expressed as $(f_1-f_2)-f_s$, where $f_s$ represents the input signal spectrum. The output $(f_1-f_2)-f_s$ from filter 17 is applied as a first input to a mixer 18. The second input to mixer 18 is that from bandpass filter 21, which represents the second harmonic output of oscillator 11, or $2f_2$.

Output from oscillator 11 is seen to be applied through a frequency doubler 22 and bandpass filter 21 to mixer 18. Output from mixer 18 is applied to bandpass filter 19, with filter 19 being designed to pass the sum of the input frequencies to mixer 18. Thus the filter 19 applies a first input signal to mixer 20 which may be expressed as $[(f_1-f_2)-f_s+2f_2]$ or $(f_1+f_2)-f_s$. A second input to mixer 20 is obtained through connector 23 from oscillator 11 and is the fundamental frequency $f_2$ of oscillator 11. Thus a differential output is developed in mixer 20 in the form of $(f_1+f_2)-f_s-f_2$ or $f_1-f_s$. The output is thus seen to be independent of the frequency $f_2$ from oscillator 11 and the differential action provided by using multiple mixing of this fundamental frequency $f_2$ of oscillator 11 and the second harmonic $2f_2$ makes possible an output $f_1-f_s$ symmetrically disposed about a predetermined center frequency $f_c$, when the frequency $f_1$ corresponding to a desired input center frequency $f_{sc}$ in the input spectrum $f_s$ is consistently defined as $f_{sc}+f_c$.

The manner in which the system permits of selection of various symmetrically disposed portions of the input spectrum $f_s$ centered about a plurality of preselected input spectrum center frequencies $f_{sc}$ and subsequent reflection of the selected portion to the output as the selected input spectrum portion centered about a fixed output center frequency, $f_c$ may best be explained by reference to a specific operating embodiment.

FIGURE 1 illustrates frequency parameters permitting selection of input spectrum center frequencies $f_{sc}$ variable in 0.5 mc. increments between 27.5 and 32.5 mc. throughout an input frequency spectrum $f_s$ between 25 and 35 mc. together with bandwidths symmetrically disposed about each of the selected center frequencies, the bandwidths being selectable in a plurality of increments varying from 0.25 mc. to a maximum of 5 mc. The output center frequency $f_c$ is to be 30 mc. regardless of the input center frequency $f_{sc}$ selected and thus oscillator 10 produces frequencies $f_1$ which are always 30 mc. above the input center frequency $f_{sc}$ in accordance with Table 1.

*Table 1*

| Input center frequency: $f_{sc}$ | Oscillator **10** $f_1$ |
|---|---|
| 32.5 | 62.5 |
| 32.0 | 62.0 |
| 31.5 | 61.5 |
| 31.0 | 61.0 |
| 30.5 | 60.5 |
| 30.0 | 60.0 |
| 29.5 | 59.5 |
| 29.0 | 59.0 |
| 28.5 | 58.5 |
| 28.0 | 58.0 |
| 27.5 | 57.5 |

Table 2 illustrates operating frequencies $f_2$ for oscillator 11, each of which corresponds to a preselected bandwidth symmetrically disposed about the input center frequency $f_{sc}$ and reflected about the fixed output center frequency $f_c$.

*Table 2*

| Bandwidth: | Oscillator **11** $f_2$ |
|---|---|
| 0.25 | 16.625 |
| 0.50 | 16.75 |
| 0.75 | 16.875 |
| 1.00 | 17.0 |
| 1.25 | 17.125 |
| 1.50 | 17.25 |
| 2.0 | 17.5 |
| 2.5 | 17.75 |
| 3.0 | 18.0 |
| 3.5 | 18.25 |
| 4.0 | 18.5 |
| 5.0 | 19.0 |

Considering the frequencies $f_1$ and $f_2$ outlined in Tables 1 and 2, it is to be emphasized that the values are by way of illustration only, and that numerous combinations may be employed within the scope of the present invention. Of prime importance here, as in any multiple mixing scheme, is to so choose the frequencies that spurious intermodulation products do not interfere with the necessary selective filtering. Examination of the operating frequencies of Tables 1 and 2 shows that, in general, $f_1$ frequencies consistently vary by a fixed frequency $f_c$ from the input center frequency $f_{sc}$ to be selected, and that each 0.5 mc. increment of change in frequency $f_2$ proportionately effects a 1 megacycle change in bandwidth. For example an $f_2$ value of 19 mc. is seen to effect a 5.0 mc. bandwidth while a reduction of $f_2$ to 18.5 mc. effects a reduction of bandwidth to 4 mc. Similarly and consistently, a further reduction of $f_2$ by 0.25 mc. to 18.25 mc. effects a bandwidth reduction of 0.5 mc. to 3.5 mc., etc. In the example outlined in Table 2, twelve bandwidths are obtainable in 0.25 mc. increments between 0.25 and 1.5 mc., in 0.5 mc. increment between 1.5 and 4.0 mc. and in a 1 mc. increment between 4.0 and 5.0 mc.

Now, considering the frequencies $f_1$ and $f_2$ outlined in Tables 1 and 2 and with reference to FIGURE 1, oscillator 10 is shown as producing frequencies in the range 57.5–62.5 mc. Oscillator 11 produces frequencies in the range 16.625–19.0 mc. Bandpass filter 14 passes $(f_1-f_2)$ and thus has a passband range of 38.5–45.875 mc. The passband of filter 14 is selected to pass the extremes of $(f_1-f_2)$ and block other unwanted spurious mixing products. Bandpass filter 21 similarly is included to prevent spurious response and thus passes a range 33.25–38 mc. to include the extremes of the second harmonic $2f_2$ of the output $f_2$ from oscillator 11.

Bandpass filters 17 and 19 are precisely designed to pass discreet portions of the output spectra generated in mixers 15 and 18 respectively. The frequency components of the incoming spectrum $f_s$ below each selected input center frequency $f_{sc}$ are restricted by the upper edge of bandpass filter 17, and the frequency components above each selected input center frequency $f_{sc}$ are restricted by the lower edge of filter 19. The specific passbands of filters 17 and 19 stem from the particular operating frequencies $f_1$ and $f_2$ for a given embodiment. In the example herein illustrated, filter 17 passes a band of frequencies from 8.5 to 13.5 mc. The characteristic may be expressed as:

$$8.5 \leqq (f_1-f_2)-f_s \leqq 13.5$$

The upper and lower edges of the passband of filter 17 may be arrived at from the illustrated embodiment as follows: The widest bandwidth BW max. to be selected is 5 mc. as shown in Table 2. Considering any one of the center frequencies $f_{sc}$ of the incoming signal (for example 30 mc.) from Table 1, the value of $f_1$ corresponding to a center frequency of 30 mc. is seen to be 60 mc. From Table 2, the value of $f_2$ corresponding to the maximum bandwidth is 19 mc. Filter 17 is to pass the differential output of mixer 15 previously defined as $(f_1-f_2)-f_s$. Letting $f_s=f_{sc}=30$ mc., the center frequency $f_{sc}$ of 30 mc. appears in filter 17 as $(60-19)-30=11$ mc. In order to pass the widest bandwidth of 5 mc. the bandwidth of filter 17 then must be $11\pm2.5$ mc. and the filter then passes the spectrum from 8.5 to 13.5 mc.

This can be seen to hold true for any of the center frequencies. In all cases the center frequency is reflected as 11 mc. to filter 17 when a 5 mc. bandwidth is desired. This is apparent from the fact that the filter is to pass $(f_1-f_2)-f_s$. Considering $f_s$ to be the selected incoming center frequency $f_{sc}$, $f_1=f_{sc}+30$ and thus the center frequency as reflected into filter 17 is independent of $f_1$ and becomes equal to $30-f_2$. Generally then, the center frequency of filter 17 is determined by the difference between the desired fixed output center frequency $f_c$ and the value $f_{2\,max}$ of $f_2$ corresponding to the maximum selectable bandwidth, $BW_{max}$.

The center frequency of filter 17 may then be generally expressed as $(f_c-f_{2\,max})$, where $f_c$ is the fixed output center frequency and $f_{2\,max}$ is the selected value of $f_2$ for the maximum selectable bandwidth, $BW_{max}$. It follows then that the passband of filter 17 may be generally expressed as:

$$(f_c-f_{2\,max}) \pm \frac{BW_{max}}{2}$$

Filter 19 passes the same spectrum increased by the inclusion of the second harmonic $2f_2$ of oscillator 11. Since the frequency $f_2$ of oscillator 11 is (from Table 2) 19 mc. for the maximum bandwidth, the pass band of filter 19 is that of filter 17 increased by $2f_2$ or 38 mc. Thus filter 19 covers a spectrum of $11\pm2.5+38$ mc. or passes a spectrum from 46.5 to 51.5 mc. The bandpass characteristics of filter 19 may thus be expressed as:

$$46.5 \leqq (f_1+f_2)-f_s \leqq 51.5$$

The center frequency of filter 19 may then be generally expressed as $(f_c-f_{2\ max})+2f_{2\ max}$ or $(f_c+f_{2\ max})$ and the passband of filter 19 may be expressed as:

$$(f_c+f_{2\ max})\pm\frac{BW_{max}}{2}$$

Figure 2:
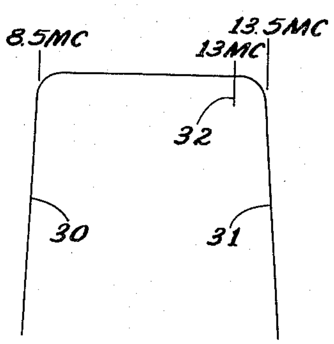
FIGURE 2 is a graphical representation of the bandwith characteristic of one of the bandwidth determining filters as employed in the illustrated embodiment of FIGURE 1.

The two filters 17 and 19 are thus seen to receive $(f_1-f_2)-f_s$ and $(f_1+f_2)-f_s$ respectively, and the selected bandwidth disposed about the selected input center frequency $f_{sc}$ is realized by selective restriction of incoming frequency components $f_s$ below the center frequency $f_{sc}$ by the upper edge of the passband of filter 17 and restriction of incoming frequency components $f_s$ above the center frequency $f_{sc}$ by the lower edge of the passband of filter 19. This principle of operation can best be illustrated by a specific example with further reference to FIGURES 2 and 3.

Figure 3:
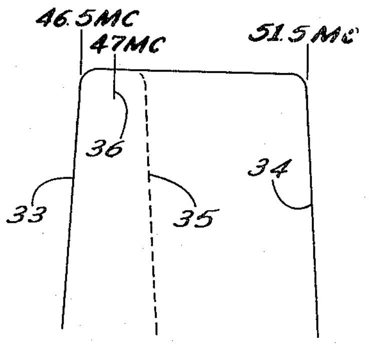
FIGURE 3 is a graphical representation of the bandwidth characteristics of a second bandwidth determining filter as employed in the illustrated embodiment of FIGURE 1.

Assume a 1 mc. bandwidth centered about 29 mc. is desired. From Table 1, a 29 mc. center frequency requires oscillator 10 to operate at 59 mc. The bandwidth table (Table 2) shows that oscillator 11 should operate at 17 mc. The outputs for oscillators 10 and 11 are combined in mixer 12 and the difference $(f_1-f_2)$ of 42 mc. is selected by bandpass filter 14 and applied to mixer 15. The 29 mc. incoming signal $f_{sc}$ (selected to be the center frequency) is combined with the $(f_1-f_2)$ signal of 42 mc. and the difference $(f_1-f_2)-f_{sc}$ of 13 mc. is selected by bandpass filter 17. The frequency components of the incoming signal $f_s$ below 29 mc. are restricted by the upper edge of the passband of filter 17. Thus filter 17 blocks incoming signals $f_s$ below 28.5 mc. (28.5 mc. reflects as a difference signal of 13.5). Now the 13 mc. center frequency reflected in filter 17 is passed to mixer 18, where it is mixed with the 34 mc. second harmonic from oscillator 11 which operates at 17 mc. for the 1 mc. bandwidth selected. The sum of the input signals to mixer 18 thus equals 13+34=47 mc. and is applied to bandpass filter 19. The incoming frequency components $f_s$ above the selected input center frequency $f_{sc}$ of 29 mc. are now restricted by the lower edge of the passband of filter 19. FIGURE 3 shows the passband of filter 19 with the lower edge 33 corresponding to 46.5 mc. and the upper edge 34 corresponds to 51.5 mc. The center frequency is reflected at 36 as 47 mc.

The dashed line of FIGURE 3 shows the effect of the upper edge 31 of the passband of filter 17. The action of filters 17 and 19 has provided an effective bandwidth of 1 mc. The 47 mc. center frequency from filter 19 is then combined in mixer 20 with the 17 mc. signal from oscillator 11 and the difference of 30 mc. appears as an output. Thus a selected 1 mc. portion of the incoming signal spectrum is reflected in the output as a passband of 1 mc. centered about 30 mc. In the embodiment illustrated, since the $f_1$ signals from oscillator 10 are always 30 mc. above the corresponding center frequency, the output is always centered about 30 mc., regardless of which of the twelve possible bandwidths is selected. The present invention thus provides means for analysis of an incoming signal spectrum by selection of portions thereof as defined by selected center frequencies and bandwidths effected by selection of discreet operating frequency of the two oscillators.

Figure 4:
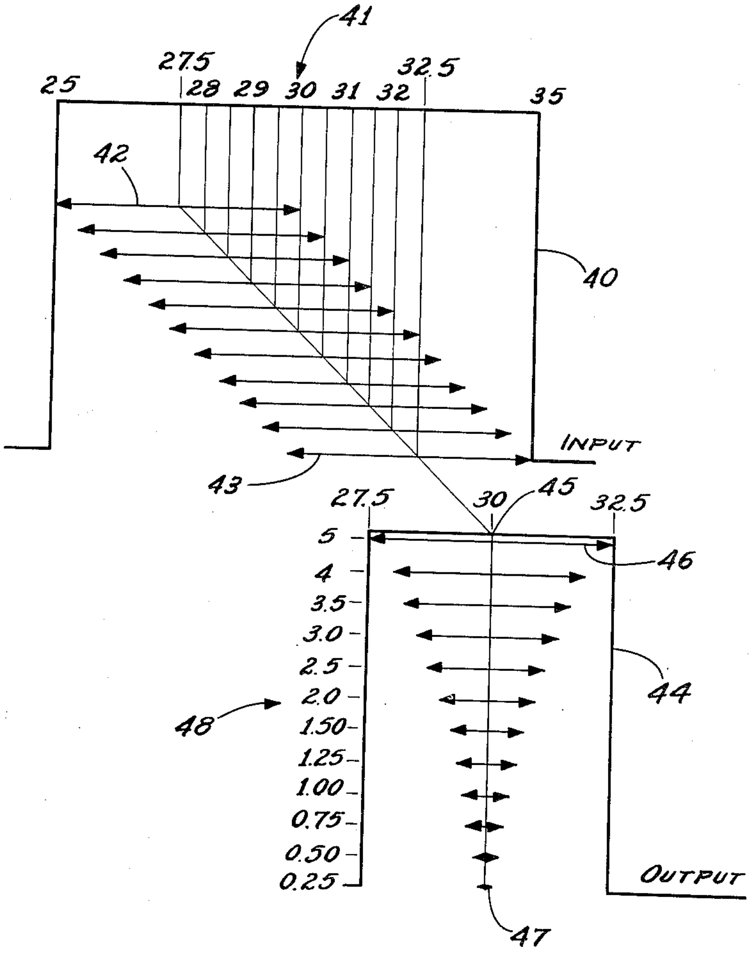
FIGURE 4 is a graphical representation of the operating characteristics of the embodiment of FIGURE 1.

The manner in which the present invention may provide a means of spectrum analysis is shown graphically in FIGURE 4. The incoming signal frequency spectrum 40 is shown to cover frequencies from 25 to 35 megacycles. Selected input center frequencies $f_{sc}$ are generally designated by reference numeral 41. The twelve selectable input center frequencies of the discussed embodiment are seen to range from 27.5 to 32.5 mc. The maximum bandwidth of 5 megacycles is illustrated graphically for each of the center frequencies 41. Thus a 5 mc. spectrum 42 centered about 27.5 mc. may be selected, for example, or a 5 mc. spectrum 43 centered about 32.5 mc. may be selected. In addition to the 5 mc. spectra centered about the input center frequencies 41, as illustrated in FIGURE 4, any one of eleven other bandwidths may be chosen, each being symmetrically disposed about a center frequency 41.

The output spectrum is shown graphically in FIGURE 4 as a 5 mc. spectrum 44 consistently disposed about a center frequency 45 of 30 mc., and remains as such for each of the 5 mc. input spectra illustrated in FIGURE 4. Alternatively, the output spectra covers any one of the selectable bandwidths 48 ranging down to a 0.25 mc. bandwidth as illustrated at 47, each being centered about the fixed output center frequency of 30 mc.

Although this invention has been described with respect to a particular embodiment thereof it is not to be so limited as changes might be made therein which are within the scope of the invention as defined by the appended claims.

I claim:

1. A variable bandwidth signal translating device for selectively passing predetermined portions of an input signal frequency spectrum, comprising: first oscillator means including control means for affecting a plurality of operating frequencies, second oscillator means including control means for effecting a plurality of operating frequencies, first signal mixing means receiving the outputs from each of said first and second oscillators and including means for selecting the difference therebetween, second mixing means receiving said input signal and the output from said first mixing means, first selective signal translating means receiving the output from said second mixing means and selecting the difference between the input signals to said first mixing means, third mixing means, frequency doubling means, said frequency doubling means receiving the output from said second oscillator, second selective signal translating means, said third mixing means receiving the outputs from said frequency doubling means and from said first selective signal translating means and supplying an output to said second selective signal translating means, said second selective signal translating means selecting the sum of the input signals to said third mixing means, fourth mixing means receiving the output from said second selective signal translating means and the output from said second oscillator, said fourth mixing means developing an output in accordance with the difference of the input signals thereto, said first and second selective signal translating means having predetermined bandwidths respectively affecting predetermined restrictions of said input signal frequency spectrum below and above a selected input signal center frequency.

2. A frequency selective signal translating device whereby predetermined portions of an input spectrum $f_s$ may be selectively translated, said predetermined portions being defined by a plurality of selectable input center frequencies $f_{sc}$ about each one of which one of a plurality of preselected symmetrical bandwidths including a maximum preselected symmetrical bandwidth $BW_{max}$ are centered and wherein each said predetermined portion of said input frequency spectrum is reflected as an output spectrum having a fixed center frequency $f_c$ about which said preselected symmetrical bandwidths are symmetrically disposed; said device comprising first and second oscillators, said first oscillator generating a predetermined plurality of frequencies $f_1$, said second oscillator generating a predetermined plurality of frequencies $f_2$, each one of said plurality of frequencies $f_1$ being defined as $(f_{sc}+f_c)$, each one of said plurality of frequencies $f_2$ effecting one of said plurality of preselected symmetrical bandwidths, a first selective mixing means receiving the outputs from said first and second oscillators and producing an output defined as $(f_1-f_2)$, second mixing means receiving the output from said first mixing means and the input frequency spectrum $f_s$, first selective filtering means receiving the output from said second mixing means defined as $$(f_1-f_2)-f_s$$

and passing predetermined portions thereof, third mixing means receiving the output from said first selective filtering means, harmonic generating means receiving the output from said second oscillator and producing a second input to said third mixing means defined as $2f_2$, said second selective filtering means receiving the output from said third mixing means defined as $(f_1+f_2)-f_s$ and passing a predetermined portion thereof, and fourth mixing means receiving the outputs from said second selective filtering means and said second oscillator and producing an output defined as $(f_1-f_s)$ symmetrically disposed about said fixed center frequency $f_c$.

3. A frequency selective signal translating device as defined in claim 2 wherein said first selective filtering means has a predetermined passband such that a preselected portion of the input applied thereto corresponding to input frequencies $f_s$ below the selected input center frequency $f_{sc}$ exceed the high end thereof and wherein said second selective filtering means has a predetermined passband such that a preselected portion of the input signal thereto corresponding to input frequencies $f_s$ above the selected input center frequency $f_{sc}$ are below the low end thereof.

4. A frequency selective signal translating device as defined in claim 2 wherein said first selective filtering means has a bandwidth defined as $$\left(f_o-f_{2\ max}\pm\frac{BW_{max}}{2}\right)$$

where $f_{2\ max}$ is the predetermined one of said plurality of frequencies $f_2$ effecting said maximum preselected symmetrical bandwidth $BW_{max}$, and wherein said second selective filtering means has a bandwidth defined as $$\left(f_o+f_{2\ max}\pm\frac{BW_{max}}{2}\right)$$

5. A frequency selective signal translating device as defined in claim 3 wherein the high end of the predetermined passband of said first selective filter is defined as $$\left(f_o-f_{2\ max}+\frac{BW_{max}}{2}\right)$$

and wherein the low end of the passband of said second selective filter is defined as $$\left(f_o+f_{2\ max}-\frac{BW_{max}}{2}\right)$$

with each of the bandwidths of said first and second selective filters being at least equal to the maximum selectable symmetrical bandwidth $BW_{max}$.

6. A frequency selective signal translating device as defined in claim 3 wherein said first selective filtering means is further defined as having a bandwidth $$\left(f_o-f_{2\ max}\pm\frac{BW_{max}}{2}\right)$$

and said second selective filtering means is further defined as having a bandwidth $$\left[f_o+f_{2\ max}\pm\frac{BW_{max}}{2}\right]$$

where $f_{2\ max}$ is the predetermined one of said plurality of frequencies $f_2$ effecting said maximum preselected symmetrical bandwidth $BW_{max}$.

References Cited in the file of this patent

UNITED STATES PATENTS 2,747,084 Doelz ---------- May 22, 1956
2,882,394 Mortley ---------- Apr. 14, 1959